(12) United States Patent
Halmo et al.

(10) Patent No.: US 11,114,702 B2
(45) Date of Patent: Sep. 7, 2021

(54) THIN BATTERY SEPARATORS AND METHODS

(71) Applicant: Celgard, LLC, Charlotte, NC (US)

(72) Inventors: Paul M. Halmo, Denver, NC (US); Xiaomin Zhang, Charlotte, NC (US); Paul D. Vido, Rock Hill, SC (US); Zhengming Zhang, Rock Hill, SC (US); Lie Shi, Matthews, NC (US); Daniel R. Alexander, Matthews, NC (US); Jill V. Watson, Lake Wylie, SC (US)

(73) Assignee: Celgard, LLC, Charlotte, NC (US)

( * ) Notice: Subject to any disclaimer, the term of this patent is extended or adjusted under 35 U.S.C. 154(b) by 50 days.

(21) Appl. No.: 16/504,808

(22) Filed: Jul. 8, 2019

(65) Prior Publication Data

US 2019/0334214 A1    Oct. 31, 2019

Related U.S. Application Data

(62) Division of application No. 15/492,062, filed on Apr. 20, 2017, now Pat. No. 10,347,951, which is a
(Continued)

(51) Int. Cl.
*H01M 4/02* (2006.01)
*H01M 10/42* (2006.01)
(Continued)

(52) U.S. Cl.
CPC ... *H01M 10/4235* (2013.01); *H01M 10/0525* (2013.01); *H01M 50/403* (2021.01);
(Continued)

(58) Field of Classification Search
CPC ...................................... H01M 4/02
See application file for complete search history.

(56) References Cited

U.S. PATENT DOCUMENTS

| | | |
|---|---|---|
| 3,426,754 A | 2/1969 | Bierenbaum et al. |
| 3,588,764 A | 6/1971 | Olsen et al. |
| (Continued) | | |

FOREIGN PATENT DOCUMENTS

| | | |
|---|---|---|
| JP | 2006-32246 A | 2/2006 |
| JP | 2006-179485 A | 7/2006 |
| | (Continued) | |

OTHER PUBLICATIONS

U.S. Appl. No. 61/609,586, filed Mar. 12, 2012, Zhang.
U.S. Appl. No. 61/680,550, filed Aug. 7, 2012, Zhang et al.

*Primary Examiner* — Jacob B Marks
(74) *Attorney, Agent, or Firm* — Hammer & Associates, P.C.

(57) ABSTRACT

In accordance with at least selected aspects, objects or embodiments, optimized, novel or improved membranes, battery separators, batteries, and/or systems and/or related methods of manufacture, use and/or optimization are provided. In accordance with at least selected embodiments, the present invention is related to novel or improved battery separators that prevent dendrite growth, prevent internal shorts due to dendrite growth, or both, batteries incorporating such separators, systems incorporating such batteries, and/or related methods of manufacture, use and/or optimization thereof. In accordance with at least certain embodiments, the present invention is related to novel or improved ultra thin or super thin membranes or battery separators, and/or lithium primary batteries, cells or packs incorporating such separators, and/or systems incorporating such batteries, cells or packs. In accordance with at least particular certain embodiments, the present invention is related to shutdown membranes or battery separators, and/or lithium primary batteries, cells or packs incorporating such separators, and/or systems incorporating such batteries, cells or packs.

23 Claims, 11 Drawing Sheets

Trilayer PP/PE/PP separator membrane with different pore sizes showing interlayer regions located at PP/PE interfaces.

Related U.S. Application Data division of application No. 14/030,158, filed on Sep. 18, 2013, now Pat. No. 9,666,847.

(60) Provisional application No. 61/703,320, filed on Sep. 20, 2012.

(51) Int. Cl.
*H01M 10/0525* (2010.01)
*H01M 50/403* (2021.01)
*H01M 50/409* (2021.01)
*H01M 50/411* (2021.01)
*H01M 50/449* (2021.01)

(52) U.S. Cl.
CPC ....... *H01M 50/409* (2021.01); *H01M 50/411* (2021.01); *H01M 50/449* (2021.01)

(56) References Cited

U.S. PATENT DOCUMENTS

| | | |
|---|---|---|
| 3,679,538 A | 7/1972 | Druin et al. |
| 3,801,404 A | 4/1974 | Druin et al. |
| 3,801,692 A | 4/1974 | Zimmerman |
| 3,843,761 A | 10/1974 | Bierenbaum et al. |
| 3,853,601 A | 12/1974 | Taskier |
| 4,138,459 A | 2/1979 | Brazinsky et al. |
| 4,539,256 A | 9/1985 | Shipman |
| 4,726,989 A | 2/1988 | Mrozinski |
| 4,994,335 A | 2/1991 | Kamaei et al. |
| 5,691,077 A * | 11/1997 | Yu ................ H01M 2/1653 429/62 |
| 6,057,060 A | 5/2000 | Yu |
| 6,132,654 A | 10/2000 | Yu |
| 6,749,961 B1 | 6/2004 | Nguyen et al. |
| 2003/0136500 A1 | 7/2003 | Yu |
| 2004/0115523 A1 | 6/2004 | Hommura et al. |
| 2006/0019154 A1 | 1/2006 | Imachi et al. |
| 2006/0141351 A1* | 6/2006 | Suh ................ H01M 2/1653 429/144 |
| 2009/0117453 A1 | 5/2009 | Kikuchi et al. |
| 2009/0123827 A1 | 5/2009 | Kono et al. |
| 2009/0169984 A1* | 7/2009 | Liang ................ H01M 2/162 429/129 |
| 2010/0028768 A1* | 2/2010 | Morita ............. H01M 4/131 429/144 |
| 2010/0099022 A1 | 4/2010 | Nishida et al. |
| 2011/0143181 A1 | 6/2011 | Ahn |
| 2012/0028086 A1* | 2/2012 | Shi ................ H01G 11/52 429/50 |
| 2012/0107656 A1 | 5/2012 | Tanizaki et al. |
| 2012/0219841 A1 | 8/2012 | Bolandi et al. |
| 2012/0231323 A1 | 9/2012 | Takagi et al. |

FOREIGN PATENT DOCUMENTS

| | | |
|---|---|---|
| JP | 2010-036355 A | 2/2010 |
| JP | 2012-014914 A | 1/2012 |

* cited by examiner

Trilayer PP/PE/PP separator membrane with different pore sizes showing interlayer regions located at PP/PE interfaces.

SEM Micrograph of Surface of 12 μm PP/PE/PP Trilayer Microporous Membrane at 20,000 Magnification SEM Cross Sectional Micrograph of 12μm PP/PE/PP Trilayer Microporous Membrane at 4,400 Magnification Illustration of Various Configurations of Single and Multilayer PE and PP Microporous Membranes.

SEM Micrograph of PP/PE/PP Trilayer Microporous Membrane with Larger Pores in Inner PE Layer.

SEM Cross Sectional Micrograph of PP/PE/PP Trilayer Membrane With Larger Pores in Inner PE Layer.

SEM Cross Sectional Micrograph of 8 um PP/PE/PP Trilayer Microporous Membrane at 5,000 Magnification.

SEM Cross Sectional Micrograph of 7 μmPP/PE/PP Trilayer Microporous Membrane at 12,000 Magnification.

SEM Cross Sectional Micrograph of 6 μm PP/PE/PP Trilayer Microporous Membrane at 12,000 Magnification.

SEM Cross Sectional Micrograph of 7 μm PP/PE/PP Trilayer Microporous Membrane at 8,500 Magnification.

SEM Cross Sectional Micrograph of 8 μmPP/PE/PP Trilayer Microporous Membrane at 8,550 Magnification.

SEM Cross Sectional Micrograph of 8 μmPP/PE/PP Trilayer Microporous Membrane at 8,550 Magnification.

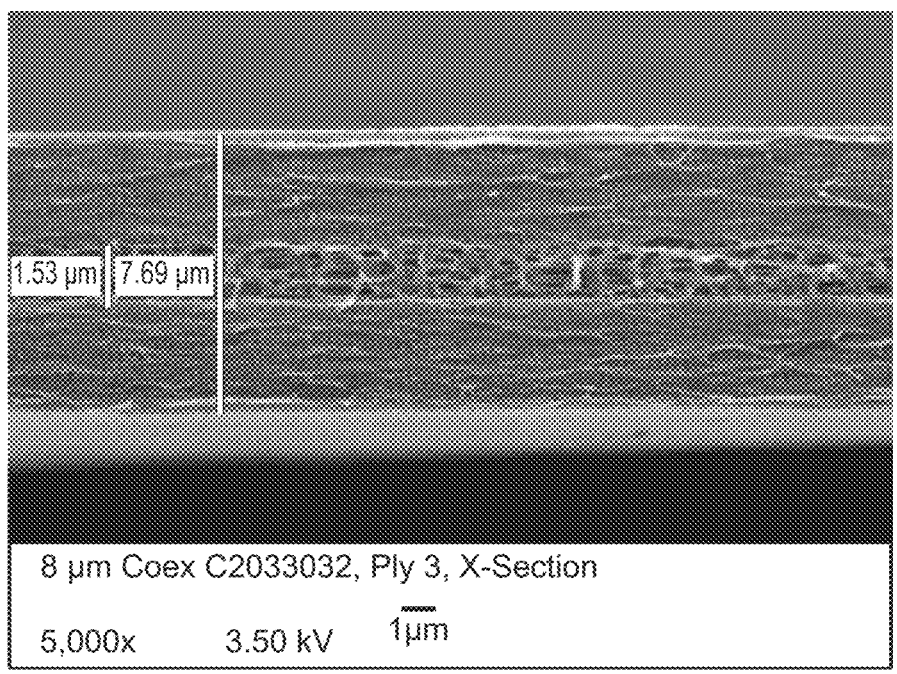
SEM Cross Sectional Micrograph of 7-8 μm PP/PE/PP Trilayer Microporous Membrane at 5,000 Magnification.
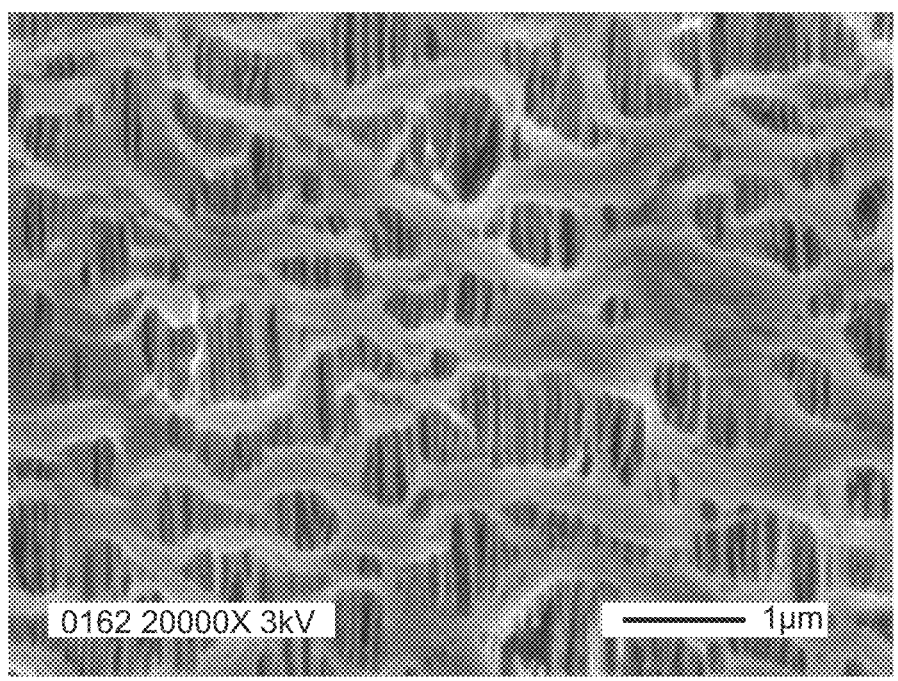
SEM Micrograph of Surface of 9 μm PE/PP/PE Trilayer Microporous Membrane at 20,000 Magnification SEM Cross Sectional Micrograph of 9 μm PE/PP/PE Trilayer Microporous Membrane at 8,500 Magnification.

SEM Cross Sectional Micrograph of 8 μm PE1/PE2/PE1 Coextruded Trilayer Microporous Membrane at 7,350 Magnification.

THIN BATTERY SEPARATORS AND METHODS

CROSS-REFERENCE TO RELATED APPLICATIONS

This application is a Divisional application claiming the benefit of co-pending application Ser. No. 15/492,062, filed, Apr. 20, 2017, which claims benefit to Divisional application Ser. No. 14/030,158 filed Sep. 18, 2013, and that application claims the benefit of and priority to U.S. provisional application Ser. No. 61/703,320 filed Sep. 20, 2012, both incorporated herein by reference.

FIELD OF THE INVENTION

At least selected embodiments of the present invention are directed to optimized, novel, unique or improved porous membranes, single layer porous membranes, multilayer porous membranes, coated porous membranes, laminates, composites, battery separators, ultra thin, ultrathin or ultra-thin battery separators, ultra thin battery separators for lithium batteries, ultra thin battery separators for secondary lithium batteries, coated ultra thin battery separators, super thin, superthin or super-thin battery separators, super thin battery separators for lithium batteries, super thin battery separators for secondary lithium batteries, coated super thin battery separators, and/or cells, packs or batteries including such membranes, laminates, composites, or separators, and/or systems or devices including such cells, packs or batteries, and/or related methods of manufacture, use and/or optimization. In accordance with at least selected embodiments, the present invention is related to ultra thin or super thin, monolayer or multilayer, coated or non-coated, unique, novel or improved battery separators that provide shutdown, that delay or prevent dendrite growth, that delay or prevent internal shorts due to dendrite growth, that increase cycle life, and/or the like, and/or cells, batteries, and/or packs incorporating such separators, and/or systems or devices incorporating such cells, batteries, and/or packs, and/or related methods of manufacture, use and/or optimization thereof. In accordance with at least certain particular embodiments, the present invention is related to novel or improved coated ultra thin monolayer battery separators that provide shutdown, prevent dendrite growth, and/or prevent internal shorts due to dendrite growth, and/or lithium primary or secondary batteries, cells or packs incorporating such separators, and/or systems incorporating such batteries, cells or packs. In accordance with at least certain other particular embodiments, the present invention is related to novel or improved coated ultra thin multilayer battery separators that provide shutdown, prevent dendrite growth, and/or prevent internal shorts due to dendrite growth, and/or lithium primary or secondary batteries, cells or packs incorporating such separators, and/or systems incorporating such batteries, cells or packs. In accordance with at least particular embodiments, the present invention is related to novel or improved ultra thin or super thin battery separators for rechargeable lithium ion batteries, cells or packs, lithium ion batteries, cells or packs incorporating such separators, and/or systems incorporating such batteries, cells or packs. In accordance with at least particular aspects or embodiments, the present invention is related to methods of optimizing an ultra thin or super thin battery separator to prevent dendrite growth in a rechargeable lithium-ion battery. In accordance with at least very particular embodiments, the present invention is directed to ultra thin, single-polymer or multi-polymer battery separators, ultra thin, monolayer, single-ply, multi-ply, or multilayer battery separators, ultra thin, ceramic coated, battery separators, super thin, single-polymer or multi-polymer battery separators, super thin, monolayer, single-ply, multi-ply, or multilayer battery separators, super thin, ceramic coated, battery separators, and/or the like.

BACKGROUND OF THE INVENTION

In batteries, the anode and cathode are separated from one another by a separator membrane. Today, "lithium batteries" are very popular because they are able to generate high energy outputs. The lithium battery market can be divided into two groups, the "primary" lithium battery and the "secondary" lithium battery. The primary lithium battery is a non-rechargeable or disposable battery, while the secondary lithium battery is a rechargeable battery.

In batteries, thin battery separators can provide several advantages that can improve the battery's performance and design. First, thinner separators enable attainment of higher rate capabilities. This means that the battery is able to produce higher current densities across the membrane because the electrical resistance of the separator can be reduced by reducing the separator's thickness. For a correlation of Gurley value to electrical resistance: see generally, Callahan, R. W. et al, "Characterization of Microporous Membrane Separators," Mar. 1-4, 1993 delivered at the Tenth International Seminar on Primary and Secondary Battery Technology and Application sponsored by Florida Educational Seminars, Inc., 2836 Banyon Blvd. Circle N.W., Boca Raton, Fla. 33431. The higher rate capabilities are important where quick power is needed (e.g., for acceleration in an electric vehicle). Second, thinner separators allow the use of thinner electrodes. This means that the battery may attain better electrode utilization and electrode cycling. The electrode utilization means that smaller batteries with equivalent power can be produced. The better electrode cycling means a greater number of rechargings or cycles over the battery's life. Third, thinner separators allow greater choice in separator design. In other words, various thin separators can be combined to custom design a separator for a particular battery.

Accordingly, there is a need in the battery arts for thinner battery separators, for thinner performing battery separators, for optimized, new or improved battery separators for certain applications or batteries, for optimized, new or improved ultra thin battery separators, for optimized, new or improved coated battery separators, and/or the like.

SUMMARY OF THE INVENTION

At least selected embodiments of the present invention may address the above needs and/or are directed to optimized, novel, unique or improved porous membranes, single layer porous membranes, multilayer porous membranes, coated porous membranes, laminates, composites, battery separators, ultra thin, ultrathin or ultra-thin battery separators, ultra thin battery separators for lithium batteries, ultra thin battery separators for secondary lithium batteries, coated ultra thin battery separators, super thin, superthin or super-thin battery separators, super thin battery separators for lithium batteries, super thin battery separators for secondary lithium batteries, coated super thin battery separators, and/or cells, packs or batteries including such membranes, laminates, composites, or separators, and/or systems or devices including such cells, packs or batteries, and/or related methods of manufacture, use and/or optimization, and/or ultra thin or super thin, monolayer or multilayer, coated or non-coated, unique, novel or improved battery separators that provide shutdown, that delay or prevent dendrite growth, that delay or prevent internal shorts due to dendrite growth, that increase cycle life, and/or the like, and/or cells, batteries, and/or packs incorporating such separators, and/or systems or devices incorporating such cells, batteries, and/or packs, and/or related methods of manufacture, use and/or optimization thereof, and/or to novel or improved coated ultra thin monolayer battery separators that provide shutdown, prevent dendrite growth, and/or prevent internal shorts due to dendrite growth, and/or lithium primary or secondary batteries, cells or packs incorporating such separators, and/or systems incorporating such batteries, cells or packs, and/or to novel or improved coated ultra thin multilayer battery separators that provide shutdown, prevent dendrite growth, and/or prevent internal shorts due to dendrite growth, and/or lithium primary or secondary batteries, cells or packs incorporating such separators, and/or systems incorporating such batteries, cells or packs, and/or to novel or improved ultra thin or super thin battery separators for rechargeable lithium ion batteries, cells or packs, lithium ion batteries, cells or packs incorporating such separators, and/or systems incorporating such batteries, cells or packs, and/or to methods of optimizing an ultra thin or super thin battery separator to prevent dendrite growth in a rechargeable lithium-ion battery, and/or to ultra thin, single-polymer or multi-polymer battery separators, ultra thin, monolayer, single-ply, multi-ply, or multilayer battery separators, ultra thin, ceramic coated, battery separators, super thin, single-polymer or multi-polymer battery separators, super thin, monolayer, single-ply, multi-ply, or multilayer battery separators, super thin, ceramic coated, battery separators, and/or the like.

In accordance with at least selected embodiments, aspects, or objects, an optimized, unique, novel or improved battery separator is made from a single layer or multilayer, microporous polyolefin membrane having a thickness of less than or equal to about 12 µm, possibly preferably less than or equal to about 11 µm, more preferably less than or equal to about 10 µm, still more preferably less than or equal to about 9 µm, still yet more preferably less than or equal to about 8 µm, even yet more preferably less than or equal to about 7 µm, even yet still more preferably less than or equal to about 6 µm, possibly even more preferably less than or equal to about 5 µm, still even more preferably less than or equal to about 4 µm, still even more preferably less than or equal to about 3 µm, and still yet even more preferably less than or equal to about 2 µm.

In accordance with at least certain selected embodiments, aspects, or objects, an optimized, unique, novel or improved battery separator is made from a single layer or multilayer, microporous polyolefin membrane having a thickness of less than or equal to about 8 µm, possibly preferably less than or equal to about 7 µm, more preferably less than or equal to about 6 µm, still more preferably less than or equal to about 5 µm, still yet more preferably less than or equal to about 4 µm, even yet more preferably less than or equal to about 3 µm, and even yet still more preferably less than or equal to about 2 µm.

In accordance with at least certain particular selected embodiments, aspects, or objects, an optimized, unique, novel or improved battery separator is made from a single layer or multilayer, shutdown microporous polyolefin membrane having at least one shutdown polyethylene layer thickness of less than or equal to about 6 µm, possibly preferably less than or equal to about 5 µm, more preferably less than or equal to about 4 µm, still more preferably less than or equal to about 3 µm, still yet more preferably less than or equal to about 2 µm, and even yet more preferably less than or equal to about 1.5 µm.

In accordance with at least selected embodiments, aspects, or objects, and as defined herein, an ultra thin, ultrathin or ultra-thin separator is preferably less than or equal to about 12 µm, and a super thin, superthin or super-thin separator is preferably less than or equal to about 8 µm. For example, in accordance with at least selected embodiments, aspects, or objects, an ultra thin or ultra-thin separator is preferably between about 8 µm to 12 µm, and a super thin or super-thin separator is preferably about 2 µm to 8 µm.

In accordance with at least selected embodiments, aspects, or objects, a coated separator preferably has a total thickness of less than or equal to about 20 µm, still more preferably less than or equal to about 16 µm, still yet more preferably less than or equal to about 14 µm, even yet more preferably less than or equal to about 12 µm, even yet still more preferably less than or equal to about 9 µm, possibly even more preferably less than or equal to about 7 µm, still even more preferably less than or equal to about 6 µm, still even more preferably less than or equal to about 5 µm, and still yet even more preferably less than or equal to about 4 µm.

Battery separators are made by several known methods, for example, the dry process, commonly referred to as the Celgard dry process, the wet process, the particle stretch process, and the beta-nucleated precursor BOPP (biaxially oriented polypropylene) process.

The dry-stretch process (the CELGARD process) refers to a process where pore formation results from stretching a nonporous, semicrystalline, extruded polymer precursor in the machine direction (MD stretch). Such a dry-stretch process is different from the wet process. Generally, in the wet process, also known as the phase inversion process, the extraction process, or the TIPS process, the polymeric raw material is mixed with a processing oil (sometimes referred to as a plasticizer), this mixture is extruded, and pores are then formed when the processing oil is removed (these films may be stretched before or after the removal of the oil).

Monolayer, single-ply, multi-ply, or multilayer battery membranes can be formed by dry process methods or techniques which can include such methods as, for example, lamination, coextrusion, collapsed bubble, and/or the like, or can be formed by wet process methods.

An exemplary Celgard dry process extrusion method for making an ultra thin or super thin microporous polyolefin membrane for use as or in a battery separator includes the steps of: extruding a monolayer or multilayer thin parison; collapsing the parison onto itself to form a flat sheet comprising two plies; slitting or trimming the edges of the flat sheet; annealing the flat sheet; stretching the flat sheet; and winding up the flat sheet (or sending it straight to slitting). The adhesion force between the two plies may be, for example, less than 8 grams per inch if the plies are intended to be separated.

The production of microporous polymer battery separators or porous membranes for battery separators in the ultra-thin or super-thin range of about 2 to 12 microns, possibly preferably about 3 to 9 microns, and optionally which retain the ability to shut down if thermal shutdown is desired, preferably sharp and sustained thermal shutdown, is possible through, for example, an extension of diaphanous PP layer application and/or discontinuous development of pore structures within the PE (shutdown) layer. Diaphanous PP layers may be used as a method of protecting a mostly PE separator from oxidative degradation in a battery. Diaphanous PP layers may involve the production of the PP layer at thicknesses in the about 1.0 to 2.0 micron range. Extension of this ultrathin PP layer concept to thinner PE shutdown layers has facilitated thinner separator developments, for example of about 6 to 9 microns or less, as the amount of PE required to achieve shutdown appears less than the earlier thinking of about 3 to 4 microns. For example, an about 2 micron PE layer may provide sharp and sustained thermal shutdown. The shutdown behavior of existing separators has historically been linked to the overall thickness of the PE shutdown layer. The present invention challenges this assertion and proposes that the PE density at the PE/PP interface is more important than the overall amount of PE material in the shutdown layer. By carefully controlling the extrusion, stretching strain rates and relaxation of the separator during pore formation, a PE structure can be achieved which has increased or desired PE density at the PP/PE surface and allows for complete shutdown of the separator enabling the PE section of the separator to be much thinner than previously achievable.

In accordance with at least selected embodiments, it may be preferred to use Ultra-thin tri-layer separators with shutdown behavior. In one embodiment, the production of battery separators in the Ultra-thin range of about 2 to 12 microns, preferably about 3 to 9 microns, and which retain the ability to thermally shut down is possible through an extension of diaphanous PP layer application, control of PE density, and/or desired development of pore structures within the PE (shutdown) layer. Diaphanous or thin PP layers may serve as a method of protecting a mostly PE separator from oxidative degradation in a battery and may involve the production of the PP layer at thicknesses in the 1.0 to 2.0 micron range, or larger. Extension of this ultrathin layer to thinner PE shutdown layers was thought limited to thin separator developments in the 6 to 9 micron range as the amount of PE required to achieve shutdown was perceived to be in the 3 to 4 microns. The shutdown behavior of existing separators has historically been linked to the overall thickness of the PE shutdown layer. At least one embodiment or aspect of this invention challenges this assertion and proposes that thinner PE layers may be used, thermal shutdown can be achieved with thinner PE layers, and the PE density at the PE/PP interface may be more important than the overall amount of PE material in the shutdown layer. By carefully controlling the extrusion, stretching strain rates and relaxation of the separator during pore formation, a PE structure can be achieved that includes a portion of small pore size PE, increased PE density at the PP/PE surface, or both, and which still provides for complete shutdown of the separator enabling the PE section of the separator to be much thinner than previously thought achievable.

Tri-layer battery separator films made with a diaphanous PP layer protecting the bulk separator from oxidative degradation and providing a rate limiting transmission layer are contemplated.

In many instances, the direct replacement of a mono-layer PE or PP separator with a typical tri-layer material consisting of PP/PE/PP configuration is not directly interchangeable as the ion transmission rate through the inner PE section is limited by lower transmission rates though the PP sections as measured by Gurley and Electrical Resistance (ER). In order to take advantage of the oxidative protection and shutdown offered by the use of a PP/PE/PP tri-layer and mitigate the higher Gurley and ER associated with this change, the inventive separator membranes include a trilayer configuration in which the PP layer thickness is reduced to levels between about 0.5 and 1.5 microns in total thickness versus a standard 4 plus micron thickness. This "diaphanous" layer of polypropylene will allow for oxidative protection of the bulk PE structure while, at the same time, the manipulation of the thickness of the diaphanous PP layer in this range can be used to control the overall ion transmission rates as measured by Gurley, ER and other test methods.

In accordance with at least certain embodiments or aspects, a method is provided for producing a tri-layer PP/PE/PP battery separator with thicknesses ranging from about 6 to 8 μm or less wherein the outermost PP layer thicknesses are controlled to be between 0.25 and 2.0 μm providing a means to control the ion and air transport rates (ER and Gurley) to the desired levels by the manipulation of the PP layer thickness. Specifically, to produce separator materials of substantial thickness (1.0 to 3 mils) or reduced thickness (12 microns or less) while being able to achieve ER and Gurley values sufficiently low to produce separator membranes which will allow for high discharge rates therethrough can be accomplished through the application of a "diaphanous" outer PP layer with a nominal thickness of 0.25 to 2.0 μm. The ultra thin, super thin or extra thin outer PP layers are an innovative and surprising extension of the Celgard dry process technology which preferably has overall thickness control tolerance of less than 2 microns and may require a high level of control of the PP extrudate mass flow. In some cases, extrusion equipment may be specifically designed for substantially lower mass flows.

In accordance with at least selected particular embodiments, it may be preferred to use tri-layer battery separator films made with a diaphanous PP layer protecting the bulk separator or PE layer from oxidative degradation and providing a rate limiting transmission layer.

In accordance with at least selected particular embodiments, it may be preferred to use a method of producing a tri-layer battery separator with thicknesses ranging from 6 to 8 μm where-in the outermost PP layer thicknesses are controlled to be between 0.25 and 2 μm providing a means to control the ion and air transport rates (ER and Gurley) to the desired levels by the manipulation of the PP layer thickness.

In accordance with at least selected objects or embodiments of the present, there is provided or disclosed optimized, novel, unique or improved porous membranes, single layer porous membranes, multilayer porous membranes, coated porous membranes, laminates, composites, battery separators, ultra thin, ultrathin or ultra-thin battery separators, ultra thin battery separators for lithium batteries, ultra thin battery separators for secondary lithium batteries, coated ultra thin battery separators, super thin, superthin or super-thin battery separators, super thin battery separators for lithium batteries, super thin battery separators for secondary lithium batteries, coated super thin battery separators, and/or cells, packs or batteries including such membranes, laminates, composites, or separators, and/or systems or devices including such cells, packs or batteries, and/or related methods of manufacture, use and/or optimization, and/or ultra thin or super thin, monolayer or multilayer, coated or non-coated, unique, novel or improved battery separators that provide shutdown, that delay or prevent dendrite growth, that delay or prevent internal shorts due to dendrite growth, that increase cycle life, and/or the like, and/or cells, batteries, and/or packs incorporating such separators, and/or systems or devices incorporating such cells, batteries, and/or packs, and/or related methods of manufacture, use and/or optimization thereof, and/or novel or improved coated ultra thin monolayer battery separators that provide shutdown, prevent dendrite growth, and/or prevent internal shorts due to dendrite growth, and/or lithium primary or secondary batteries, cells or packs incorporating such separators, and/or systems incorporating such batteries, cells or packs, and/or to novel or improved coated ultra thin multilayer battery separators that provide shutdown, prevent dendrite growth, and/or prevent internal shorts due to dendrite growth, and/or lithium primary or secondary batteries, cells or packs incorporating such separators, and/or systems incorporating such batteries, cells or packs, and/or novel or improved ultra thin or super thin battery separators for rechargeable lithium ion batteries, cells or packs, lithium ion batteries, cells or packs incorporating such separators, and/or systems incorporating such batteries, cells or packs, and/or methods of optimizing an ultra thin or super thin battery separator to prevent dendrite growth in a rechargeable lithium-ion battery, and/or to ultra thin, single-polymer or multi-polymer battery separators, ultra thin, monolayer, single-ply, multi-ply, or multilayer battery separators, ultra thin, ceramic coated, battery separators, super thin, single-polymer or multi-polymer battery separators, super thin, monolayer, single-ply, multi-ply, or multilayer battery separators, super thin, ceramic coated, battery separators, and/or the like.

BRIEF DESCRIPTION OF THE DRAWINGS

FIG. 13. SEM Cross Sectional Micrograph of 7-8 µm PP/PE/PP Trilayer Microporous Membrane at 5,000 Magnification.

FIG. 14. SEM Surface Micrograph of 9 µm PE/PP/PE Trilayer Microporous Membrane at 20,000 Magnification.

FIG. 17 shows two examples of a typical thermal shutdown of a film sample occurring at approximately 130-132 deg C. where Electrical Resistance sharply rises from about 8 to 10,000 ohm-cm$^2$. The sustained high level of Electrical Resistance of > or =10,000 ohm-cm$^2$ from 130 deg C. to 175 deg C. is indicative of 'complete' thermal shutdown.

FIG. 18 shows two examples of an 'incomplete' thermal shutdown of a film sample occurring at approximately 128 deg C. where Electrical Resistance sharply rises from about 10 to a little over 1.0×10$^2$ ohm-cm$^2$, followed by a decrease on ER.

DETAILED DESCRIPTION OF THE INVENTION

Figure 1:
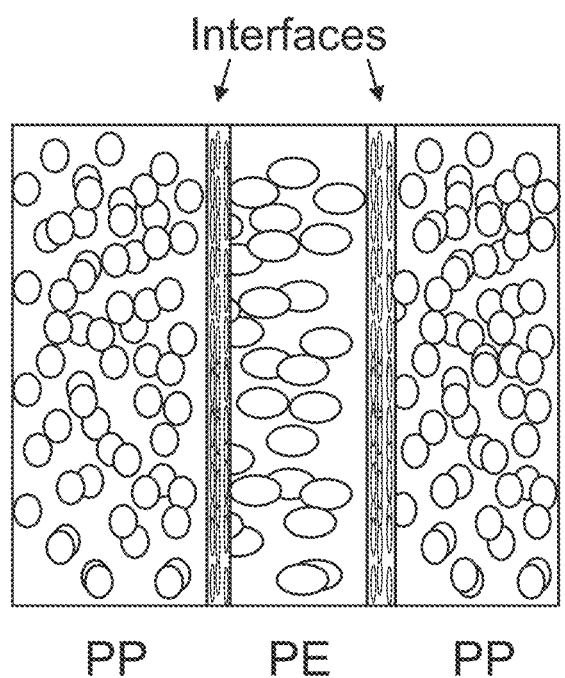
FIG. 1. Schematic illustration of a PP/PE/PP trilayer microporous separator membrane depicting PP/PE interfaces.
Figure 2:
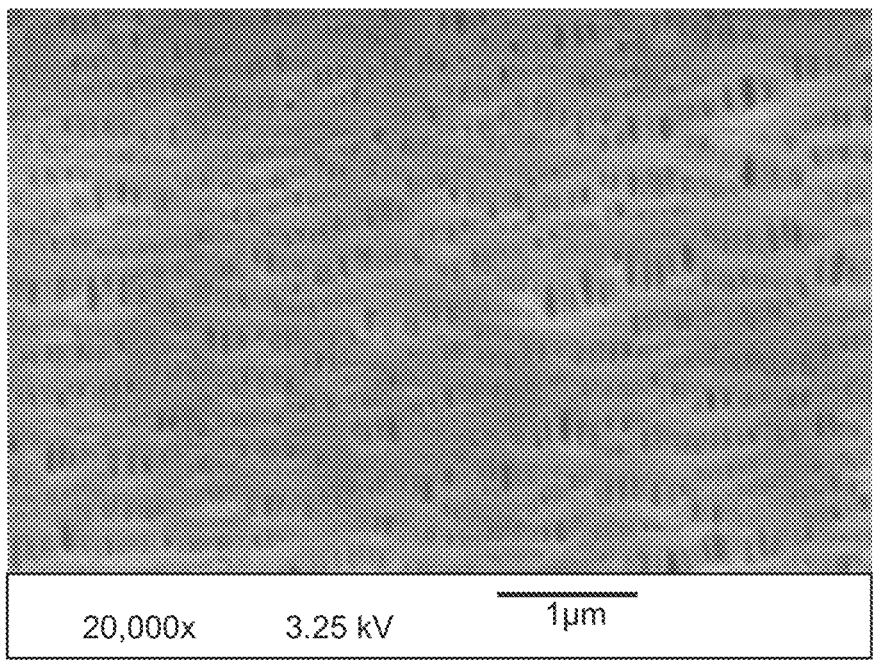
FIG. 2. SEM Micrograph of Surface of 12 µm PP/PE/PP Trilayer Microporous Membrane at 20,000 Magnification.
Figure 3:
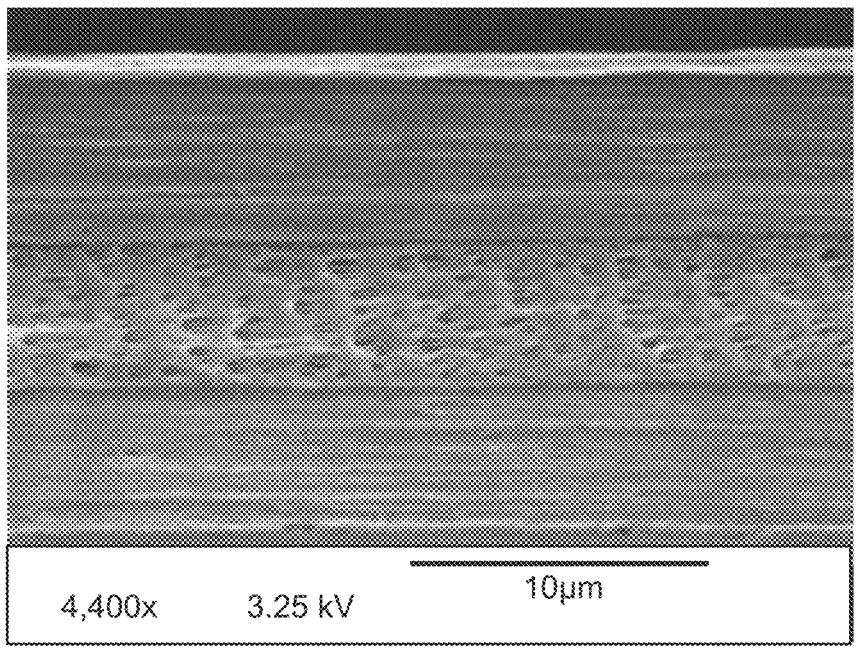
FIG. 3. SEM Cross Sectional Micrograph of 12 µm PP/PE/PP Trilayer Microporous Membrane at 4,400 Magnification.
Figure 4:
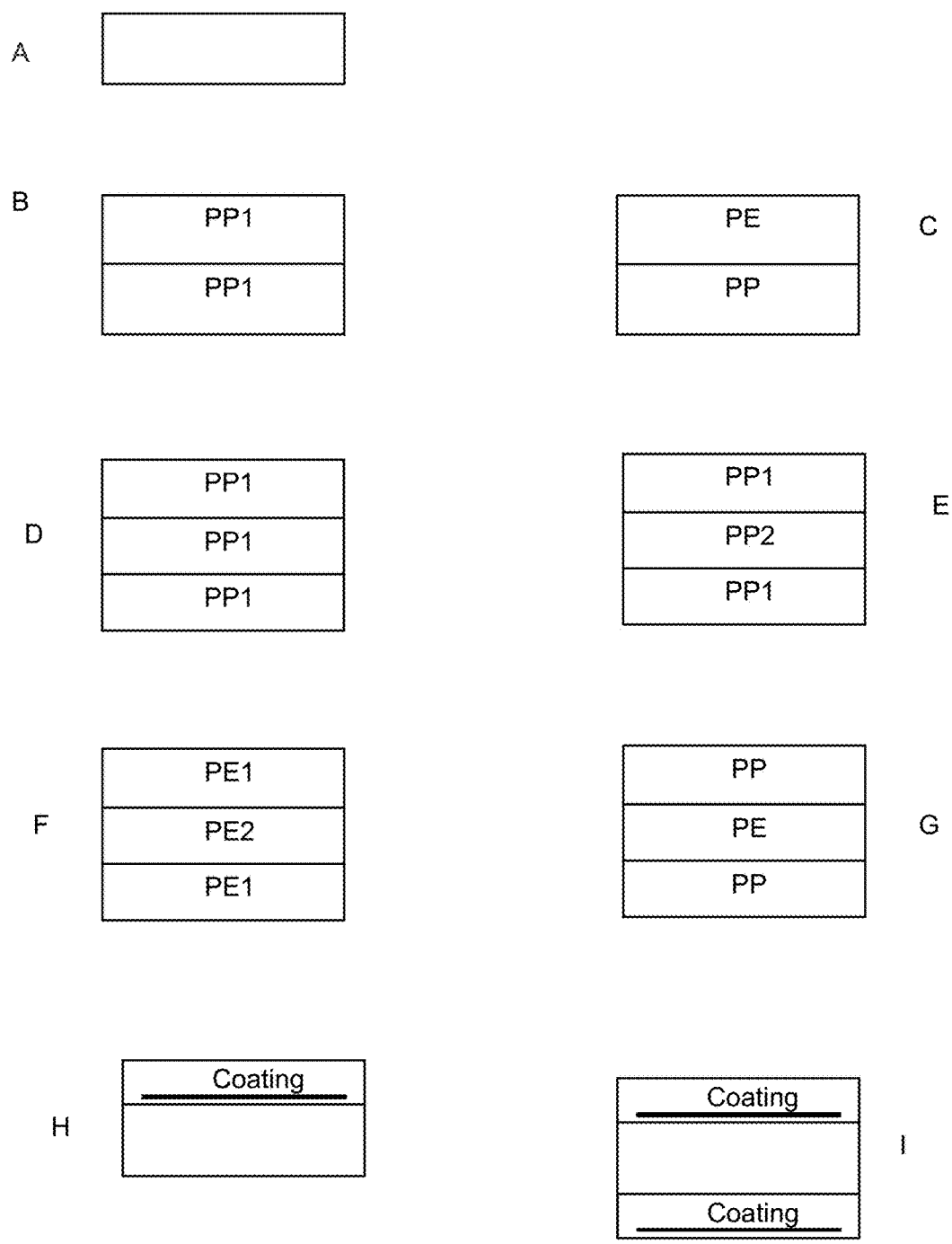
FIG. 4. Schematic end view illustrations of Various Configurations of Single and Multilayer PE and PP Microporous Membranes.
Figure 5:
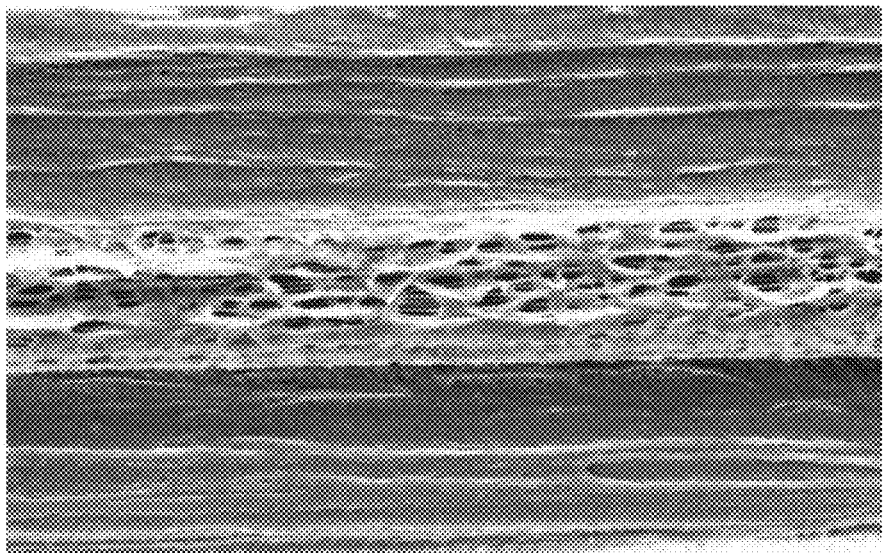
FIG. 5. SEM Cross Sectional Micrograph of PP/PE/PP Trilayer Microporous Membrane with Larger Pores in Inner PE Layer.
Figure 6:
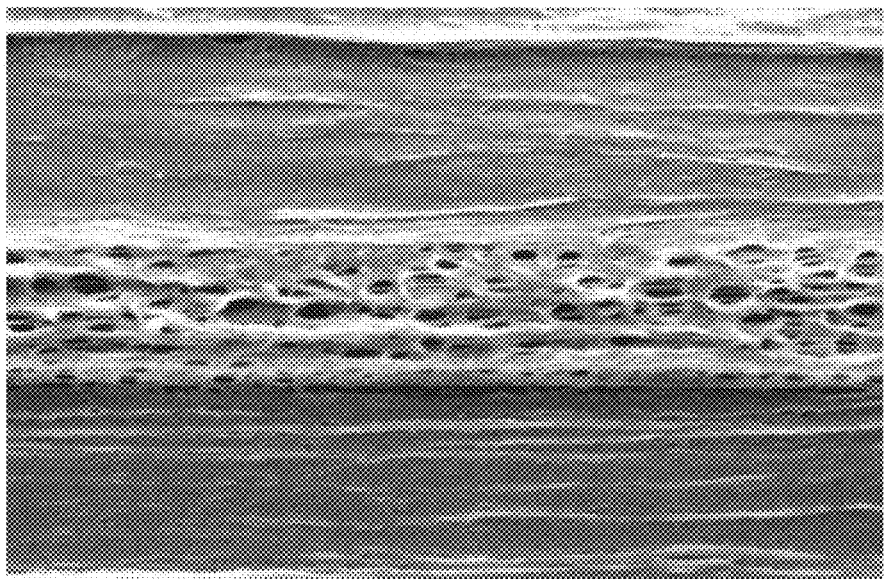
FIG. 6. SEM Cross Sectional Micrograph of PP/PE/PP Trilayer Membrane With Larger Pores in Inner PE Layer.
Figure 7:
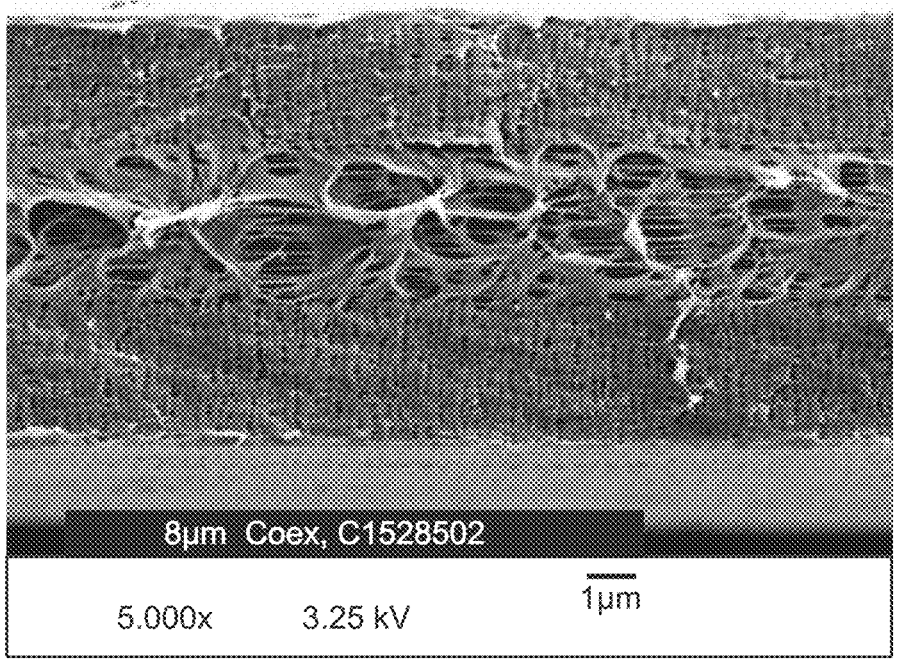
FIG. 7. SEM Cross Sectional Micrograph of Surface of 8 µm PP/PE/PP Trilayer Microporous Membrane at 5,000 Magnification.
Figure 8:
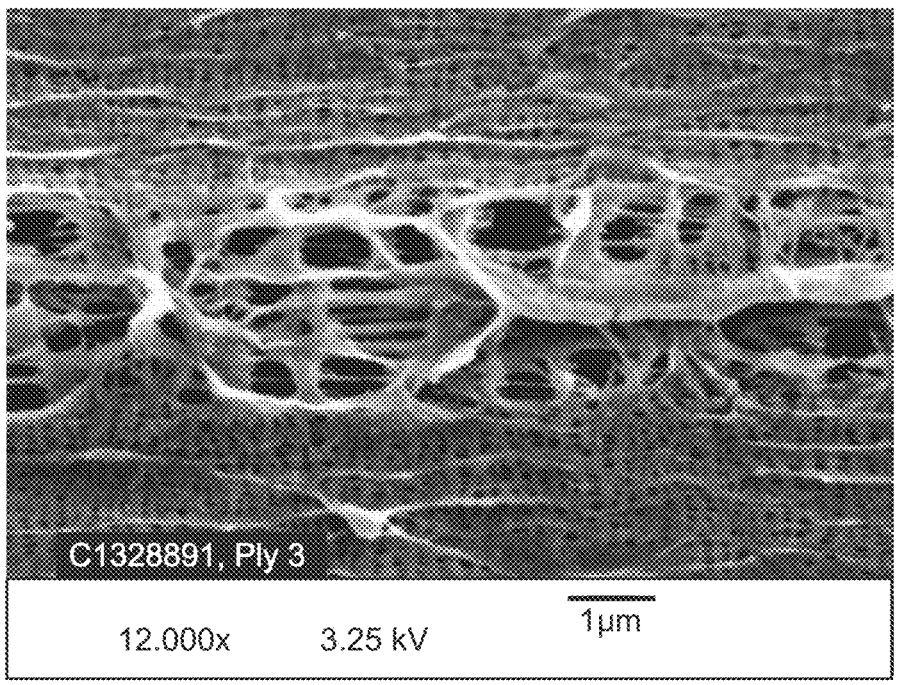
FIG. 8. SEM Cross Sectional Micrograph of 7 µm PP/PE/PP Trilayer Microporous Membrane at 12,000 Magnification.
Figure 9:
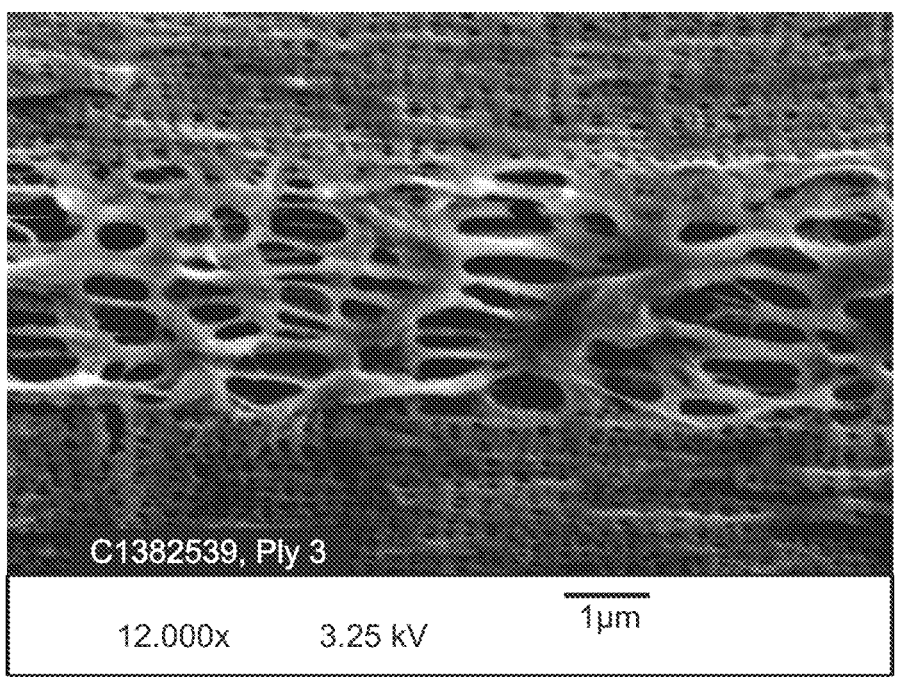
FIG. 9. SEM Cross Sectional Micrograph of 6 µm PP/PE/PP Trilayer Microporous Membrane at 12,000 Magnification.
Figure 10:
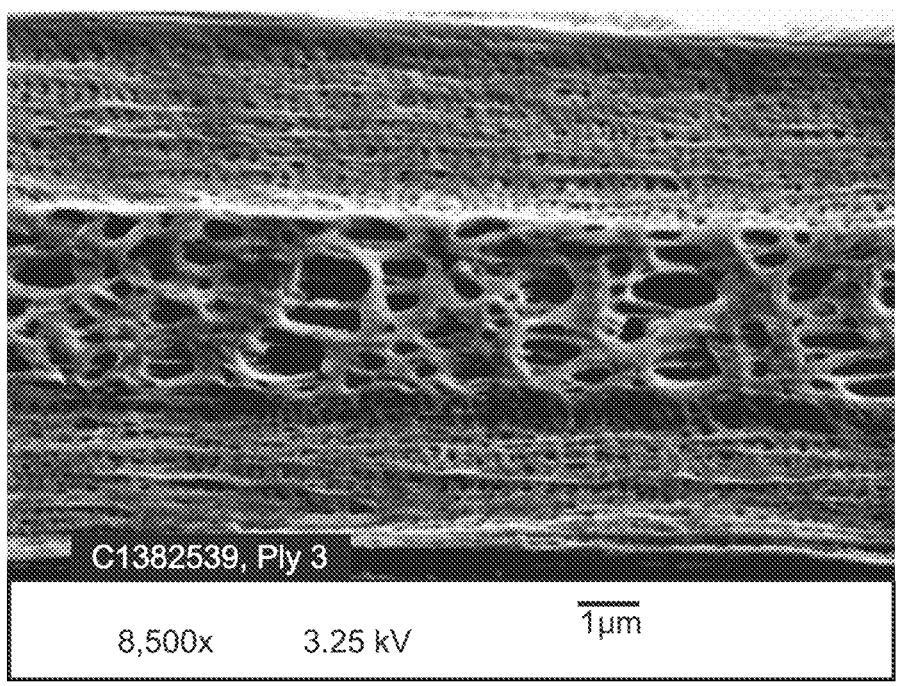
FIG. 10. SEM Cross Sectional Micrograph of 7 µm PP/PE/PP Trilayer Microporous Membrane at 8,500 Magnification.
Figure 11:
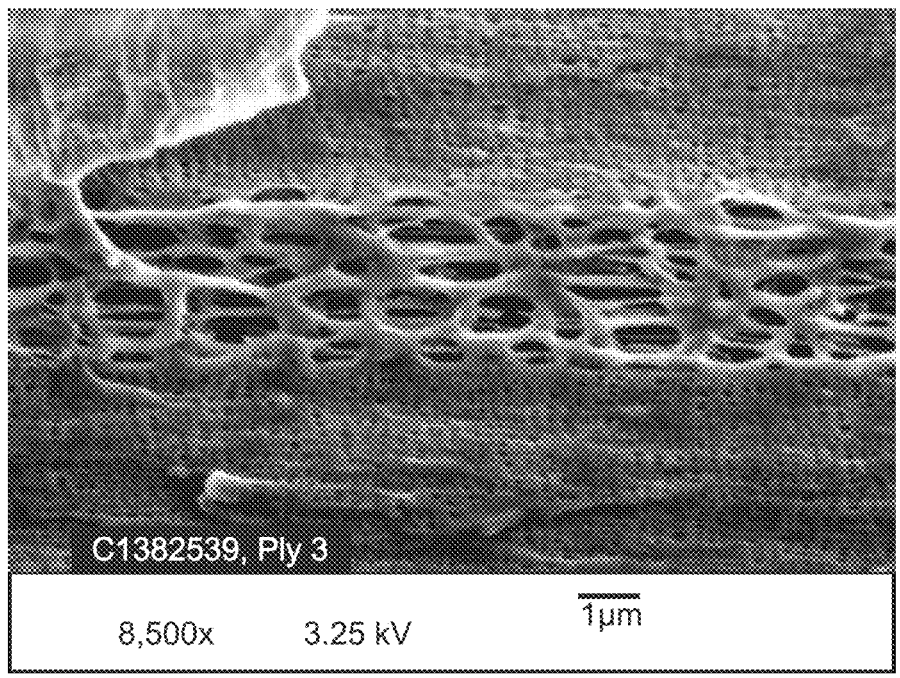
FIG. 11. SEM Cross Sectional Micrograph of 8 µm PP/PE/PP Trilayer Microporous Membrane at 8,550 Magnification.
Figure 12:
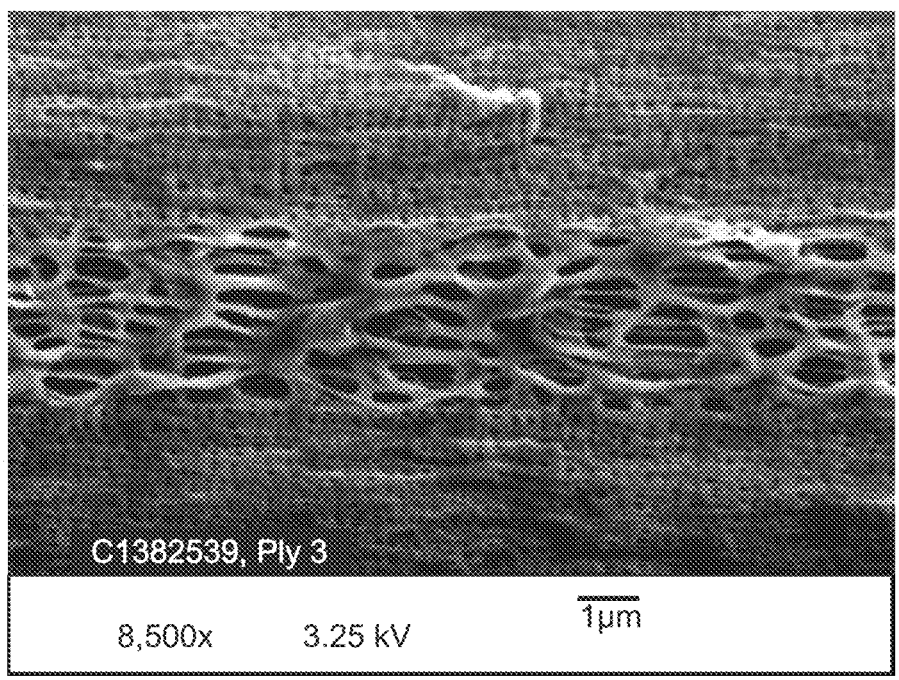
FIG. 12. SEM Cross Sectional Micrograph of 8 µm PP/PE/PP Trilayer Microporous Membrane at 8,500 Magnification.
Figure 15:
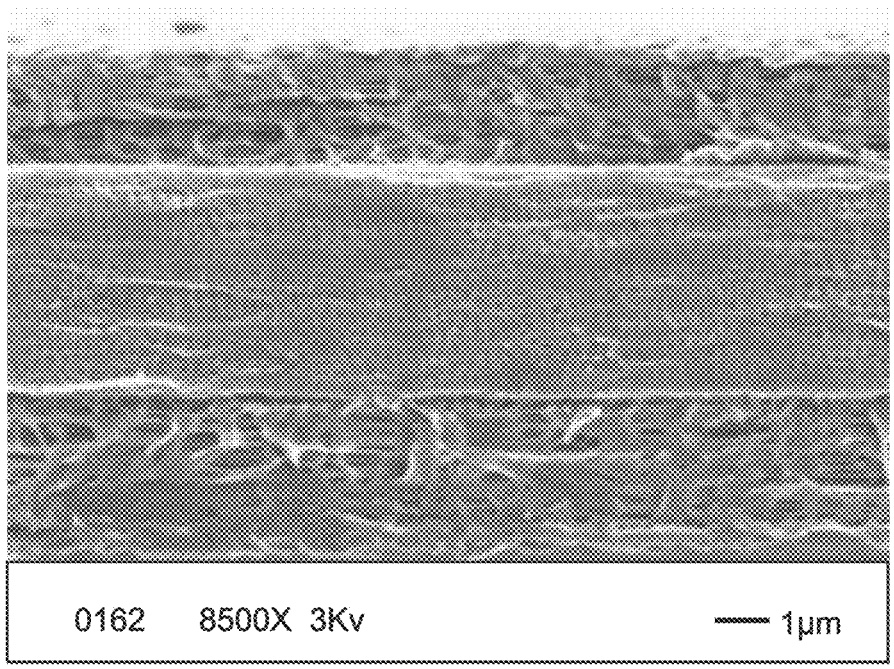
FIG. 15. SEM Cross Sectional Micrograph of 9 µm PE/PP/PE Trilayer Microporous Membrane at 8,500 Magnification.
Figure 16:
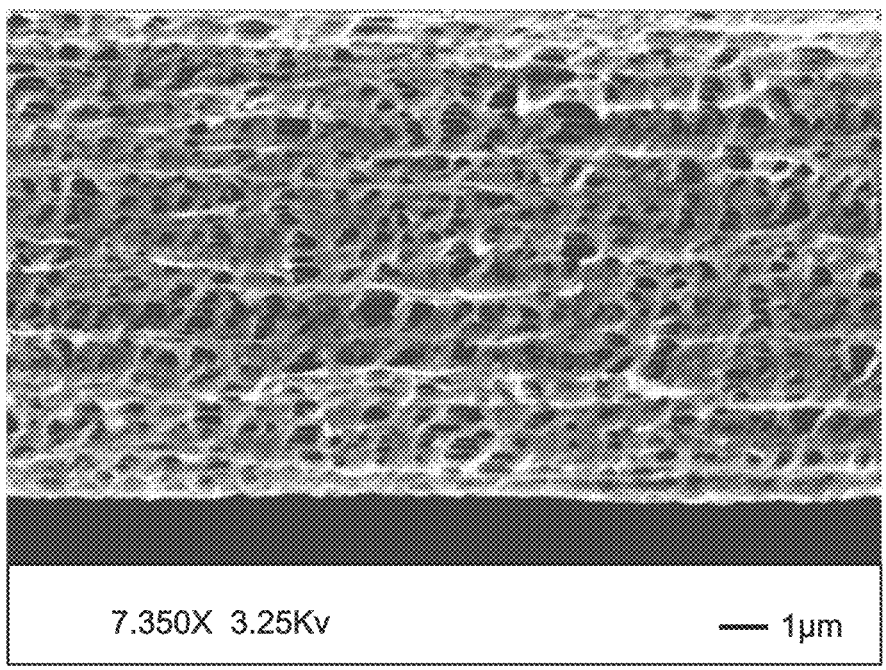
FIG. 16. SEM Cross Sectional Micrograph of 8 µm PE1/PE2/PE1 Coextruded Trilayer Microporous Membrane at 7,350 Magnification.

At least selected embodiments of the present invention are directed to optimized, novel, unique or improved porous membranes, single layer porous membranes, multilayer porous membranes, coated porous membranes, laminates, composites, battery separators, ultra thin, ultrathin or ultra-thin battery separators, ultra thin battery separators for lithium batteries, ultra thin battery separators for secondary lithium batteries, coated ultra thin battery separators, super thin, superthin or super-thin battery separators, super thin battery separators for lithium batteries, super thin battery separators for secondary lithium batteries, coated super thin battery separators, and/or cells, packs or batteries including such membranes, laminates, composites, or separators, and/or systems or devices including such cells, packs or batteries, and/or related methods of manufacture, use and/or optimization, and/or ultra thin or super thin, monolayer or multilayer, coated or non-coated, unique, novel or improved battery separators that provide shutdown, that delay or prevent dendrite growth, that delay or prevent internal shorts due to dendrite growth, that increase cycle life, and/or the like, and/or cells, batteries, and/or packs incorporating such separators, and/or systems or devices incorporating such cells, batteries, and/or packs, and/or related methods of manufacture, use and/or optimization thereof, and/or to novel or improved coated ultra thin monolayer battery separators that provide shutdown, prevent dendrite growth, and/or prevent internal shorts due to dendrite growth, and/or lithium primary or secondary batteries, cells or packs incorporating such separators, and/or systems incorporating such batteries, cells or packs, and/or to novel or improved coated ultra thin multilayer battery separators that provide shutdown, prevent dendrite growth, and/or prevent internal shorts due to dendrite growth, and/or lithium primary or secondary batteries, cells or packs incorporating such separators, and/or systems incorporating such batteries, cells or packs, and/or to novel or improved ultra thin or super thin battery separators for rechargeable lithium ion batteries, cells or packs, lithium ion batteries, cells or packs incorporating such separators, and/or systems incorporating such batteries, cells or packs, and/or to methods of optimizing an ultra thin or super thin battery separator to prevent dendrite growth in a rechargeable lithium-ion battery, and/or to ultra thin, single-polymer or multi-polymer battery separators, ultra thin, monolayer, single-ply, multi-ply, or multilayer battery separators, ultra thin, ceramic coated, battery separators, super thin, single-polymer or multi-polymer battery separators, super thin, monolayer, single-ply, multi-ply, or multilayer battery separators, super thin, ceramic coated, battery separators, and/or the like.

PATENT EXAMPLES

In accordance with at least certain embodiments of the current invention, Tables 1-3 include data on Samples 1 through 10.

TABLE 1

Ultra Thin and Super Thin Microporous Membrane Separator Properties.

| ID | Sample 1 T43078 PP/PE/PP | Sample 2 T44254 PP/PE/PP | Sample 3 T52934 PP/PE/PP | Sample 4 T60175 PP/PE/PP | Sample 5 T59018 PE/PE/PE | Sample 6 T15805 PE Mono |
|---|---|---|---|---|---|---|
| % Thicknesses | 33/33/33 | 33/33/33 | 33/33/33 | 40/20/40 | 33/33/33 | 100 |
| Thickness (um) | 8.8 | 8.6 | 8.4 | 8.8 | 7-9 | 9 |
| JIS Gurley (s) | 400 | 328 | 195 | 321 | 150-300 | 186 |
| Porosity (%) | 29.8-30.53 | 33.16-34.6 | 33.1-34.5 | 31.0-33.5 | 36-40 | 40.0 |
| Puncture Strength (g) | 173 | 164 | 112 | 157 | 120-180 | 166 |
| PP Pore Size (µm) | 0.027 | 0.025 | 0.034 | 0.026-0.029 | xxx | xxx |
| PE Pore Size (µm) | 0.056 | 0.068 | 0.083 | 0.059-0.065 | .040-.065 | 0.045 |
| 90 deg C. % Shrinkage | 0.33 | 0.94 | 2.0 | 2.8 | >5 | 3.4 |
| 105 deg C. % Shrinkage | 1.6 | 3.21 | 6.6 | 7.0 | >15 | 11.2 |
| 120 deg C. % Shrinkage | 3.44 | 8.30 | 17.4 | 20 | >30 | 27.8 |
| MD Tensile (kgf/cm$^2$) | 2085 | 2317 | 1362 | 1770 | 2000-2800 | 2658 |
| TD Tensile (kgf/cm$^2$) | 177 | 162 | 189 | 182 | 100-180 | 127 |
| MD % Elongation | 67.9 | 78 | 80 | 100 | 40-80 | 39 |
| TD % Elongation | 62.7 | 72 | 57 | 53 | 400-1000 | 975 |
| Thermal Shutdown | Yes/Sharp | Yes/Sharp | Yes/Sharp | Yes/Sharp | Yes | Yes |

Samples 1-4 PP/PE/PP tri-layer materials with excellent shutdown with a wide of porosity range between 29 and 35%.
Samples 5 and 6 are PE materials with more typical porosity ranges.

TABLE 2

PP/PE/PP 12 µm Trilayer Microporous Membrane Separator Properties With 4 µm PE Inner Layer.

| | Sample 7 PP/PE/PP 33/33/33 |
|---|---|
| Thickness (um) | 12 |
| JIS Gurley (s) | 412 |
| Porosity (%) | 35 |
| Puncture Strength (g) | 220 |
| PP Pore Size (µm) | 0.069 |
| PE Pore Size (µm) | 0.025 |
| % MD Shrinkage 90 deg C. | 0.72 |
| % MD Shrinkage 105 deg C. | 2.8 |
| % MD Shrinkage 120 deg C. | 8.5 |
| MD Tensile (kgf/cm$^2$) | 2147 |
| TD Tensile (kgf/cm$^2$) | 157 |
| MD % Elongation | 67 |
| TD % Elongation | 200 |
| Shutdown | yes |

TABLE 3

Ultra Thin and Super Thin Microporous Membrane Separator Properties.

| Description | Sample 8 PP/PE/PP | Sample 9 PP/PE/PP | Sample 10 PP/PE/PP |
|---|---|---|---|
| Thickness (µm) | 9.4 | 9.05 | 9.75 |
| JIS Gurley (sec) | 189 | 381 | 195 |
| Puncture Strength (g) | 147 | 141 | 154 |
| TD Tensile Stress (kgf/cm$^2$) | 161 | 199 | 188 |
| % Porosity | 48.56 | 42.57 | 43.35 |
| % MD Shrinkage 90 deg C./1 hr | <5 | <5 | 5.00 |
| Shutdown | incomplete | incomplete | incomplete |

In accordance with at least certain selected embodiments of the present invention, Table 4 provides possibly preferred separator properties.

TABLE 4

Ultra Thin and Super Thin Microporous Membrane Separator Embodiment Properties.

| Description | Embodiment A | Embodiment B | Embodiment C | Embodiment D |
|---|---|---|---|---|
| Thickness (µm) | 9.5 to 12.0 | 6.5 to 9.5 | 5.5 to 6.5 | 3.5-5.5 |
| Thickness Range (µm) | +/−2.0 | +/−1.5 | +/−1.0 | +/−1.0 |
| JIS Gurley(sec) | 150 to 450 | 100 to 400 | 100 to 400 | 75-150 |
| Puncture Strength (gr) | 150 to 350 | 120 to 300 | 100 to 300 | 100-200 |
| Porosity (%) | 34 to 40 | 30 to 38 | 30 to 38 | 26-36 |
| PE Pore Size (µm) | <0.1 | <0.1 | <0.1 | <0.1 |
| PP Pore Size (µm) | 0.020 to 0.050 | 0.020 to 0.050 | 0.020 to 0.050 | 0.020 to 0.050 |
| MD % Shrinkage 90 C./1 hr | <3 | <3 | <3 | <3 |
| MD % Shrinkage 105 C. | <10 | <10 | <10 | <10 |
| MD % Shrinkage 120 C. | <20 | <20 | <20 | <20 |
| TD Tensile (kgf/cm2) | 130 to 300 | 130 to 300 | 130 to 300 | 100 to 250 |
| MD Elongation (%) | 50-150 | 50-150 | 50-150 | 50-150 |
| TD Elongation (%) | 75 to 300 | 50 to 250 | 50 to 250 | 50-250 |
| MD Tensile(kgf/cm2) | 700 to 2500 | 700 to 1800 | 700 to 1800 | 500 to 1500 |

TABLE 4-continued

Ultra Thin and Super Thin Microporous Membrane Separator Embodiment Properties.

| Description | Embodiment A | Embodiment B | Embodiment C | Embodiment D |
|---|---|---|---|---|
| PP layer Thickness (μm) | 3.5 to 4.5 | 2.3-2.7 | 1.6 to 2.2 | 1.0 to 2.25 |
| PE Layer Thickness (μm) | 3.0 to 5.0 | 2.6-3.4 | 1.6 to 2.8 | 1.0 to 2.25 |
| Thermal Shutdown | Yes | Yes | Yes | Yes |

Coated Example

Celgard® Polyethylene (PE) 12 μm microporous separator membrane was coated with a mixture of an aqueous polymeric binder consisting of a copolymer of polysodium acrylate, acrylamide and acrylonitrile combined with Degussa $Al_2O_3$ceramic particles with average particle size is <2 um. The coating was two side, both side or double side coated with total coating thickness of 4 um. The final coated membrane thickness was 16 μm. May be coated on one or both sides. Base film may be single or multi-layer.

Comparative Example

To illustrate the difference or comparison of a control separator (non-woven, Separator 2) to the inventive or preferred separator (microporous multi-layer, Separator 1) with respect to lithium dendrite growth through separator membrane and internal short due to such lithium dendrite growth, two-electrode coin cells were fabricated with graphite as the working electrode and lithium metal as the counter material. Two different types of separator membranes were used and studied. Separator 1 is a tri-layer separator membrane with micro porous structure (preferred) and Separator 2 represents a stand-alone non-woven type structured separator membrane (control).

Test 1 involves several charge and discharge cycles where the cutoff voltage is set to 5 mV for charging or lithium intercalation into working electrode and 2V for discharging or lithium deintercalation from working electrode. A current density of 1 mA/cm2 was used in this test for both charging and discharging.

Cells with preferred or inventive Separator 1 continuously cycles with no fluctuation in cell voltage during any charge or discharge step. Cells with Separator 2 (the control non-woven) were not able to be cycled similar to cells with Separator 1, within two to three cycles, cells with Separator 2 showed more fluctuations in voltage and were not able to reach the cutoff voltages and eventually failed.

A Separator 1 taken from the cell that had undergone cycling and a Separator 2 (control) taken from the cell that had undergone cycling show that Separator 1 shows no signs of lithium dendrite growth or internal short associated with Li dendrite growth, the Separator 1 looks clear with no signs of black or burnt spots, but Separator 2 (control) shows many black or burnt spots throughout Separator 2 which clearly confirms the internal short due to lithium dendrite.

It was determined that lithium dendrite growth and propagation linked to battery performance and/or safety issues are more probable for the non-woven stand-alone type separator membranes because its key properties include large pore size, higher porosity, much lower tortuosity, and/or lower Z-direction mechanical strength. Such properties of non-woven stand-alone type separator membranes may accelerate the lithium dendrite growth into this type of separator membrane's pore structure and cause, allow or promote the negative issues, reduce cycle life of the lithium ion battery, etc. Dendrites need room or space to grow. The non-woven stand-alone type separator membranes provide such room and space.

In accordance with at least certain preferred aspects or embodiments of the present invention, there are five basic properties of concern for designing, optimizing, selecting, or making a well performing microporous membrane for a battery separator or as a battery separator: 1) Tortuosity, 2) Porosity, 3) Pore size, 4) Pore size distribution, and 5) Mechanical strength. Each of these properties can have a significant effect on the performance of the separator and battery. Furthermore, it can be said that proper selection of these properties can have a synergistic effect defining the superior performance of a preferred battery separator, separator membrane, battery, and/or the like.

In accordance with at least selected preferred aspects or embodiments of the present invention, the preferred method of optimizing a separator membrane for a secondary rechargeable lithium ion battery includes the steps of defining and selecting the preferred microporous structure of the separator, that is, the pore size, pore size distribution, porosity, tortuosity, and mechanical strength of the separator membrane.

In accordance with at least selected preferred aspects, objects or embodiments of the present invention, an optimized battery separator membrane controls and prevents the growth of dendrites, which results in longer better cycle life of a battery and improved battery safety.

It has been discovered or determined, that a separator with very high porosity, large pore size, low tortuosity, and poor mechanical strength are welcoming factors for dendrite growth. An example of a separator with these undesirable properties is bare nonwoven spun bonded separator membranes.

In contrast, and in accordance with at least selected preferred aspects, objects or embodiments of the present invention, at least certain preferred monolayer, bilayer, trilayer, and other multilayer microporous battery separators or membranes (such as Celgard® separators made by Celgard, LLC of Charlotte, N.C.) have the desired balance of pore size, pore size distribution, porosity, tortuosity, and mechanical strength to inhibit dendrite growth. Celgard® microporous battery separator membranes can be made, for example, by either the dry process or wet process. It is their unique microporous structure, properties, layers, and the like which can be optimized to retard dendrite growth.

The pores in at least certain preferred Celgard® microporous separators or membranes provide a network of interconnected tortuous pathways that limit the growth of dendrite from the anode, through the separator, to the cathode. The more winding the porous network, the higher the tortuosity of the separator membrane. The high tortuosity of such Celgard® microporous separator membranes is a unique feature that may play a critical role in improving the cycle life performance and the safety of certain Li-ion batteries.

It has been discovered to be advantageous to have a microporous separator membrane with high tortuosity between the electrodes in a battery in order on order to avoid cell failure. A membrane with straight through pores is defined as having a tortuosity of unity. Tortuosity values greater than 1 are desired in at least certain preferred battery separator membranes that inhibit the growth of dendrites. More preferred are tortuosity values greater than 1.5. Even more preferred are separators with tortuosity values greater than 2.

The tortuosity of the microporous structure of at least certain preferred dry and/or wet process separators (such as Celgard® battery separators) may play a vital role in controlling and inhibiting dendrite growth. The pores in at least certain Celgard microporous separator membranes may provide a network of interconnected tortuous pathways that limit the growth of dendrite from the anode, through the separator, to the cathode. The more winding the porous network, the higher the tortuosity of the separator membrane.

The high tortuosity of at least certain preferred microporous separator membranes (such as Celgard® membranes of Celgard, LLC of Charlotte, N.C.) is a unique feature that may play a critical role in improving the cycle life performance and the safety of certain Li-ion batteries. It has been discovered to be advantageous to have a microporous separator membrane with high tortuosity between the electrodes in a rechargeable battery in order on order to avoid cell failure.

An inventive method to further increase a separator's overall tortuosity is to form an interface between the layers of a multi-layer separator membrane as is depicted in FIG. 1. An interface is formed when a porous polymer layer is laminated or coextruded to another or other porous polymer layers in the manufacture of a multilayer separator membrane. This interface formed at the junction of the porous polymer layer has a microporous structure defined by its own pore size, porosity, thickness, and tortuosity. Depending on the number of layers of microporous polymer layers joined together to form the multilayer microporous separator membrane, multiple interface layers can be formed contributing to the overall tortuosity of the battery separator membrane and the superior performance in blocking dendrite growth.

Furthermore, at least certain preferred examples or methods for optimizing a secondary rechargeable lithium ion battery separator membrane for prevention of dendrite deposition and prevention of dendrite growth through a separator membrane by including an enhanced tortuosity layer or interlayer in a separator membrane are:

1. Polypropylene (PP) and polyethylene (PE) multilayer laminate microporous separator membranes (such as manufactured by the Celgard® dry stretch process) have an interlayer at the junction of the polypropylene and polyethylene layers as shown in FIG. 1. This interface is formed during the lamination process step and has a unique microstructure defined by its porosity, pore size and tortuosity. This interface provides a region of smaller pore size and higher tortuosity network of interconnected pores which enhance the separator membrane's ability to discourage, prevent or inhibit lithium dendrite growth and lithium dendrite penetration through the multilayer membrane structure.

2. Polypropylene and polyethylene multilayer separator membranes manufactured by a co-extrusion method have a unique interlayer which is formed as the nonporous polypropylene and polyethylene layers of the membrane exit the co-extruder die. This layer is further defined as an epitaxial region or an epitaxial layer that is created at the interface of the polypropylene and polyethylene layers as the nonporous membrane exits the co-extrusion extruder die. The formation of the epitaxial layer involves the growth of the lamellar crystal structure as the multilayer nonporous membrane (or membrane precursor) exits the die.

3. Certain monolayer microporous separator membranes manufactured using the dry process may also have a microstructure suitable for prevention of lithium dendrite growth.

4. Monolayer and multilayer microporous separator membranes manufactured using the wet process may also have a microstructure suitable for prevention of lithium dendrite growth.

5. A porous coating applied to the surface of a microporous battery separator or membrane may have a microstructure which provides a tortuous porous network which functions to reduce or prevent dendrite growth through the separator membrane. The porous coating can be single or double sided. The application of a coating layer or layers onto a microporous battery separator or membrane has a further beneficial effect on the reduction of dendrite growth. The application of one or more coating layers, for example, Polyvinylidene fluoride (PVdF), PVDF-HFP copolymer, to one or both surfaces of a Celgard® microporous membrane improves the adhesion of the separator membrane to the battery electrodes. Good adhesion between the coated separator and the battery electrode improves the contact between the separator and the electrode resulting in less void space for lithium deposition and the initiation of dendritic growth.

6. A ceramic coating (such as ceramic particles in a binder) applied to the surface of a microporous battery separator or membrane has a microstructure which provides a tortuous porous network which functions to reduce or prevent dendrite growth through the separator membrane. The porous coating can be single or double sided. The application of a coating layer or layers onto a microporous battery separator or membrane has a further beneficial effect on the reduction of dendrite growth.

Certain preferred such Celgard® multilayer separators would potentially exhibit excellent performance in many lithium metal based rechargeable battery systems such as Li—S, Li-LCO, Li-LMO, $SnLi_x$, $SiLi_x$ and non-rechargeable battery systems such as Li—MnO2, Li—FeS2. Furthermore, Celgard® mutilayer separators can also be used in Lithium/Air battery systems.

In addition, application of a coating layer or layers onto certain separators (such as Celgard® separators) can have a beneficial effect on the reduction of dendrite growth and penetration into a separator membrane. The microstructure of a porous coating provides can also provide an additional highly tortuous porous network layer to prevent the growth of lithium dendrites.

Furthermore the application of a coating layer, for example the polymer Polyvinylidene Fluoride (PVdF), to one or both surfaces of a microporous membrane (such as a Celgard® microporous membrane) may improve the adhesion of the separator membrane to the electrodes. Good adhesion of the separator membrane to the electrode improves the contact between the separator and the electrode, resulting in less void space existing for lithium deposition to occur in and less void space for the initiation of dendritic growth.

FIG. 1 schematically depicts two interfaces present in a typical Celgard® PP/PE/PP trilayer separator membrane. This type of separator has smaller PP pores in the outer layers of the trilayer separator membrane and larger PE pores in the inner layer of the trilayer.

Polyolefin, as used herein, refers to a class or group name for thermoplastic polymers derived from simple olefins. Exemplary polyolefins include polyethylene and polypropylene. Polyethylene refers to, for example, polymers and copolymer substantially consisting of ethylene monomers. Polypropylene refers to, for example, polymers and copolymers substantially consisting of propylene monomers.

The process, by which the inventive separators are made, broadly comprises and is not limited to the dry process, the wet process, the particle stretch process, the BNBOPP process, and/or the like. By way of non-limiting example, the following references, each of which is incorporated herein by reference, illustrate the state of the art for making membranes: U.S. Pat. Nos. 3,426,754; 3,588,764; 3,679,538; 3,801,404; 3,801,692; 3,843,761; 3,853,601; 4,138,459; 4,539,256; 4,726,989; 4,994,335; 6,057,060; and 6,132,654, each of the foregoing is incorporated herein by reference. Knowledge of these methods being assumed in the inventive process for making ultra thin or super thin membranes (preferred thickness less than about ½ mil).

Typical Test Procedures

JIS Gurley

Gurley is defined as the Japanese Industrial Standard (JIS) Gurley and is measured using the OHKEN permeability tester. JIS is defined as the time in seconds required for 100 cc of air to pass through one square inch of film at a constant pressure of 4.9 inches of water.

Thickness

Thickness is measured using the Emveco Microgage 210-A precision micrometer according to ASTM D374. Thickness values are reported in units of microns, μm.

Porosity

Porosity, expressed as a percentage, is measured using ASTM D-2873 and is defined as the % void spaces in a microporous membrane.

Tensile Properties

Machine direction (MD) and Transverse direction (TD) tensile strength is measured using Instron Model 4201 according to ASTM-882 procedure.

Thermal Shutdown

Figure 17:
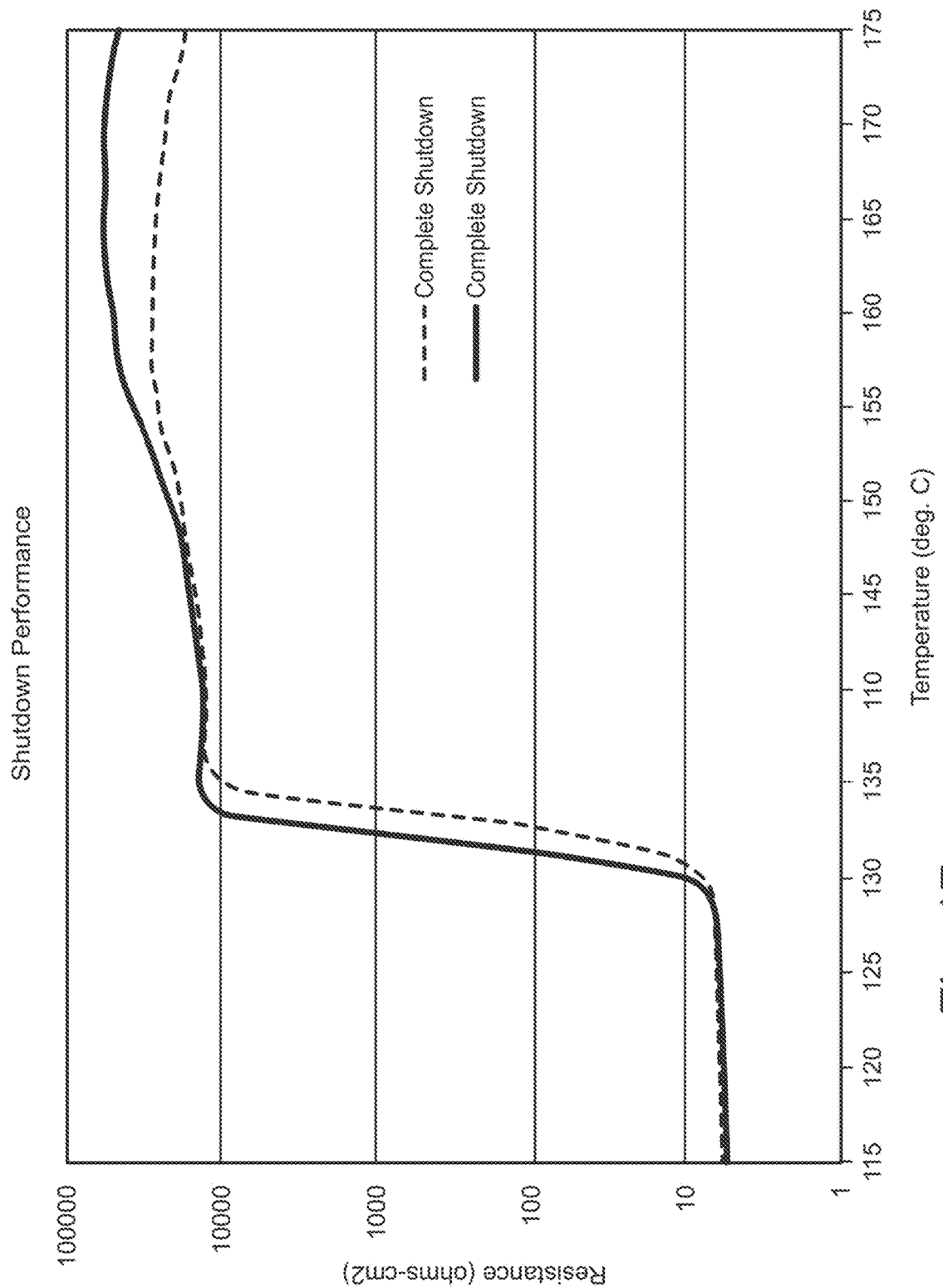
FIG. 17. Example Thermal Shutdown Plot of Electrical Resistance (ER) as a Function of Temperature.
Figure 18:
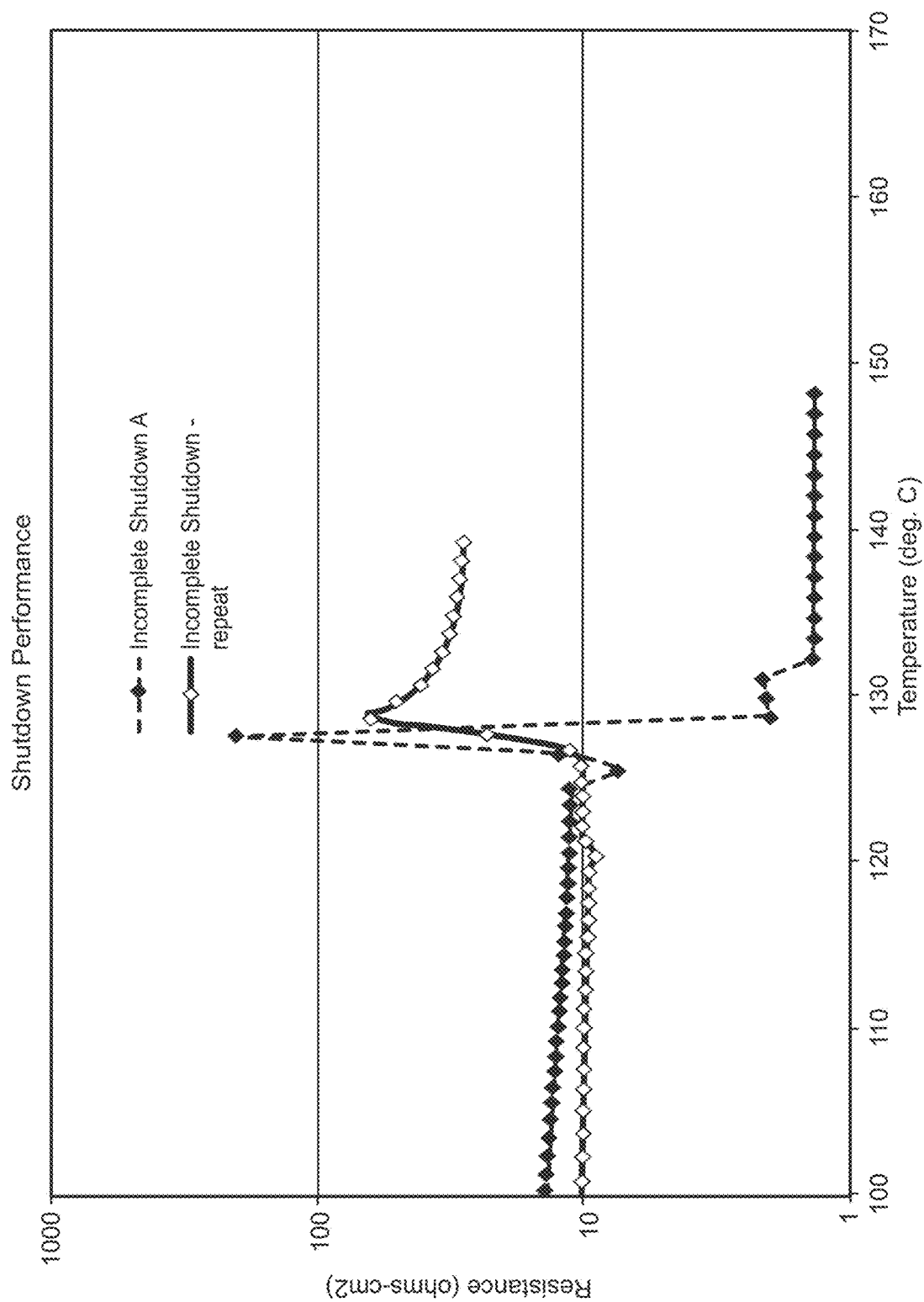
FIG. 18. Example Thermal Shutdown Plot of Electrical Resistance (ER) as a Function of Temperature.

Thermal shutdown is determined by measuring the impedance of a separator membrane while the temperature is linearly increased. See FIG. 17. Shutdown temperature is defined as the temperature at which the Impedance or Electrical resistance (ER) increases thousand-fold. A thousand-fold increase in Impedance is necessary for a batter separator membrane to stop thermal runaway in a battery. The rise in Impedance corresponds to a collapse in pore structure due to melting of the separator membrane.

Shrinkage

Shrinkage is measured at 90, 105 and 120 degree. C. for 60 minutes using a modified ASTM D-2732-96 procedure.

Puncture Strength

Puncture strength is measured using Instron Model 4442 based on ASTM D3763. The units of puncture strength are grams. The measurements are made across the width of stretched product and the averaged puncture energy (puncture strength) is defined as the force required to puncture the test sample.

Pore Size

Pore size is measured using the Aquapore available through PMI (Porous Materials Inc.). Pore size is expressed in microns, μm.

Exemplary Ultra thin or Super thin separator constructions or configurations include without limitation: 4 (ceramic/PP/PE/PP), 5 (ceramic/PP/PE/PP/ceramic), or 6 layer (ceramic/PP/PE/PE/PP/ceramic); all PE or all PP separators, multi-ply or multi-layer all PP or all PE, coextruded, collapsed bubble, and/or laminated; bi-layer, tri-layer, quad-layer, or multi-ply all PE separators, 3 (ceramic/PE/PE), 4 (ceramic/PE/PE/ceramic), 4 (ceramic/PE/PE/PE), 5 (ceramic/PE/PE/PE/ceramic), 5 (ceramic/PE/PE/PE/PE), or 6 layer (ceramic/PE/PE/PE/PE/ceramic); 3 (ceramic/PE/PVDF), 4 (ceramic/PE/PE/ceramic), 4 (ceramic/PE/PE/PE), 5 (ceramic/PE/PE/PE/ceramic), 5 (ceramic/PE/PE/PE/PE), or 6 layer (ceramic/PE/PE/PE/PE/ceramic); all PP with ceramic, for example, 3 (ceramic/PP/PP), 4 (ceramic/PP/PP/ceramic), 4 (ceramic/PP/PP/PP), 5 (ceramic/PP/PP/PP/ceramic), 5 (ceramic/PP/PP/PP/PP), or 6 layer (ceramic/PP/PP/PP/PP/ceramic); PP/PE with ceramic, for example, 3 (ceramic/PE/PP), 3 (ceramic/PP/PE), 4 (ceramic/PE/PP/ceramic), 4 (ceramic/PP/PE/PP), 4 (ceramic/PE/PP/PE), 4 (ceramic/PP/PP/PE), 4 (ceramic/PP/PE/PE), 5 (ceramic/PP/PE/PP/ceramic), 5 (ceramic/PE/PE/PP/PP), 5 (ceramic/PE/PE/PP), 6 (ceramic/PE/PE/PP/PP/ceramic), or 6 layer (ceramic/PP/PE/PE/PP/ceramic); all PE with PVDF, for example, 3 (PE/PE/PVDF), 4 (PVDF/PE/PE/PVDF), 4 (PVDF/PE/PE/PE), 5 (PVDF/PE/PE/PE/PVDF), 5 (PVDF/PE/PE/PE/PE), or 6 layer (PVDF/PE/PE/PE/PE/PVDF); all PE with ceramic and PVDF, for example, 3 (ceramic/PE/PVDF), 4 (ceramic/PE/PE/PVDF), 5 (ceramic/PE/PE/PE/PVDF), or 6 layer (ceramic/PE/PE/PE/PE/PVDF); all PP with PVDF, for example, 3 (PP/PP/PVDF), 4 (PVDF/PP/PP/PVDF), 4 (PVDF/PP/PP/PP), 5 (PVDF/PP/PP/PP/PVDF), 5 (PVDF/PP/PP/PP/PP), or 6 layer (PVDF/PP/PP/PP/PP/PVDF); all PP with ceramic and PVDF, for example, 4 (ceramic/PP/PP/PVDF), 5 (ceramic/PP/PP/PP/PVDF), or 6 layer (ceramic/PP/PP/PP/PP/PVDF); PP/PE with PVDF, for example, 3 (PVDF/PE/PP), 3 (PVDF/PP/PE), 4 (PVDF/PE/PP/PVDF), 4 (PVDF/PP/PE/PP), 4 (PVDF/PE/PE/PP), 4 (PVDF/PP/PP/PE), 4 (PVDF/PP/PE/PE), 5 (PVDF/PP/PE/PP/PVDF), 5 (PVDF/PE/PE/PP/PP), 5 (PVDF/PP/PE/PE/PP), 5 (PVDF/PP/PP/PE/PE), 6 (PVDF/PE/PE/PP/PP/PVDF), 6 (PVDF/PE/PP/PP/PE/PVDF), or 6 layer (PVDF/PP/PE/PE/PP/PVDF); PP/PE with ceramic and PVDF, for example, 4 (ceramic/PE/PP/PVDF), 4 (ceramic/PP/PE/PVDF), 5 (ceramic/PE/PE/PP/PVDF), 5 (ceramic/PP/PP/PE/PVDF), 5 (ceramic/PP/PE/PE/PVDF), 5 (ceramic/PP/PE/PP/PVDF), 6 (ceramic/PE/PE/PP/PP/PVDF), 6 (ceramic/PP/PE/PE/PP/PVDF), 6 (ceramic/PE/PP/PP/PE/PVDF), or 6 layer (ceramic/PP/PP/PE/PE/PVDF); and/or the like.

By combining Ultra Thin or Super thin separators or membranes with ceramic coating, with PVDF coating, with dendrite prevention, with shutdown, with coextrusion, with dry process, and/or the like, optimized, new, novel, unique, or improved separators are produced.

With regard to annealing and stretching conditions, the inter-ply adhesion (measured as peel strength) may be lower than that of the standard process, so that the individual plies do not split (i.e. tear apart) when they are deplied. The ability to resist splitting is proportional to the ply's thickness. Thus, if the plies stick together (due to adhesion) and the stickiness is greater than the split resistance, then the plies cannot be separated (deplied) without splitting. For example, the adhesion of plies having a thickness of about 1 mil may be less than about 15 grams/inch, whereas for 0.5 mil plies, the adhesion may be less than about 8 grams/inch, and for 0.33 mil plies, may be less than about 5 grams/inch. To lower the adhesion values, the annealing/stretching temperatures for the inventive process may be less than those for the standard process.

The following U.S. patent applications are hereby fully incorporated by reference herein: U.S. provisional patent application Ser. No. 61/609,586, filed Mar. 12, 2012; and, U.S. patent application Ser. No. 61/680,550, filed July Aug. 7, 2012.

In accordance with at least selected aspects, objects or embodiments, optimized, novel or improved membranes, battery separators, batteries, and/or systems and/or related methods of manufacture, use and/or optimization are provided. In accordance with at least selected embodiments, the present invention is related to novel or improved battery separators that prevent dendrite growth, prevent internal shorts due to dendrite growth, or both, batteries incorporating such separators, systems incorporating such batteries, and/or related methods of manufacture, use and/or optimization thereof. In accordance with at least certain embodiments, the present invention is related to novel or improved ultra thin or super thin membranes or battery separators, and/or lithium primary batteries, cells or packs incorporating such separators, and/or systems incorporating such batteries, cells or packs.

In accordance with at least one aspect of the present invention, it has been discovered that substantially all rechargeable lithium ion batteries using carbon based anode materials and lithium metal anode material, experience lithium dendrite growth through a separator membrane, especially batteries which use a stand-alone non-woven type separator membrane, and that one needs to account for this phenomenon and one needs to prevent dendrite growth through the battery's separator membrane and one needs to prevent internal shorts or shorts due to dendrite growth in order to prevent premature cell failure and in order to produce longer life lithium and lithium ion batteries.

During charging of rechargeable lithium ion batteries which have carbon based or lithium metal anodes, lithium ions from the cathode are transported via an electrolyte medium, through a microporous separator membrane to the anode of the battery. The opposite would occur during discharge where lithium ions from anode move to the cathode. With continuous charge and discharge cycles, minute fibers or tentacles of lithium metal called lithium dendrites are believed to form and grow on the surface of the anode. These dendrites build up and grow from the anode surface through the separator establishing an electronic pathway which results in a short circuit and the failure of the battery. Unabated, dendritic growth can cause thermal runaway to occur which compromises the safety of lithium ion batteries. The growth of dendrites has additional detrimental effects on lithium ion battery performance. Dendrite formation is known to reduce the cycle life of rechargeable lithium ion batteries.

In accordance with at least another aspect, object or embodiment of the present invention, it has been discovered that the battery separator membrane can be designed, optimized, manufactured, and/or treated to address or prevent dendrite growth, and to produce longer life lithium ion batteries incorporating such novel or improved separators.

Lithium dendrites growing from the surface of an anode and/or from the surface of the solid electrolyte interface (SEI) may cause battery performance and safety issues when the dendrites grow into and through a separator membrane and fully penetrate the separator to reach the other side of the separator membrane. If the lithium dendrites grow to form a dendritic bridge connecting the positive and negative electrodes, the battery will short and fail to function properly. Unabated, dendritic growth can cause thermal runaway to occur which compromises the safety of lithium ion batteries. The growth of dendrites has additional detrimental effects on lithium ion battery performance. Dendrite formation is known to reduce the cycle life of rechargeable lithium ion batteries. Controlling and inhibiting dendrite growth is of primary interest in the improvement of the performance of rechargeable lithium-ion batteries. An important method of controlling and inhibiting dendrite growth is the use of the proper or optimized microporous battery separator membranes.

The present invention maybe embodied in other specific forms without departing from the spirit or essential attributes thereof, and, accordingly, reference should be made to the appended claims, rather than to the foregoing specification as indicating the scope of the invention.

We claim:

1. A multilayer battery separator for a lithium secondary battery that comprises a microporous membrane comprising:
   at least three coextruded dry-stretch process polypropylene (PP) layers and optionally one or more polyethylene (PE) layers that each has a thickness of less than or equal to 4 microns; and
   wherein the microporous membrane has a thickness in the range of 2 to 12 microns and has a ceramic coating or a polymer coating on at least one side thereof.

2. The separator of claim 1 wherein the microporous membrane has a thickness from 2 to 10 microns.

3. The separator of claim 1 wherein the microporous membrane has a thickness in the range of 3 to 9 microns.

4. The separator of claim 1, wherein the microporous membrane has a thickness in the range from 8 to 12 microns.

5. The separator of claim 1 wherein the microporous membrane has a thickness from 6 to 9 microns.

6. The separator of claim 1 wherein the microporous membrane has a thickness in the range of 6 to 8 microns.

7. The separator of claim 1, wherein the microporous membrane has at least three PE layers.

8. The separator of claim 1, wherein the microporous membrane has at least one PE layer.

9. The separator of claim 8, wherein the microporous membrane has at least one PP layer that protects the at least one PE layer from oxidative degradation.

10. The separator of claim 1, wherein at least one layer of the microporous membrane is less than 4 microns thick.

11. The separator of claim 1 having a ceramic coating on at least one side thereof.

12. The separator of claim 1, having a ceramic coating on both sides thereof.

13. The separator of claim 1 having a PVDF coating on at least one side thereof.

14. The separator of claim 1 having a PVDF:HFP coating on at least one side thereof.

15. The separator of claim 1, wherein the separator has a thickness less than 20 microns.

16. The separator of claim 15, wherein the thickness is less than 16 microns.

17. The separator of claim 15, wherein the thickness is less than 14 microns.

18. A battery comprising the separator of claim 1.

19. The separator of claim 1 having a trilayer construction of at least one of PP/PP/PP, PP/PE/PP, PE/PE/PE, or PE/PP/PE.

20. The separator of claim 1 having a trilayer construction of at least one of the following: each of the layers being about 1 μm to 4 μm thick, each of the layers being about 1 μm to 3 μm thick, or each of the layers being about 1 μm to 2 μm thick.

21. The separator of claim 1 wherein the separator has a puncture strength of at least 112 g.

22. A multilayer battery separator for a lithium secondary battery that comprises a microporous membrane comprising:
- at least three coextruded dry-stretch process polypropylene (PP) layers and optionally one or more polyethylene (PE) layers that each has a thickness of less than or equal to 4 microns; and
- wherein the microporous membrane has a thickness in the range of 2 to 12 microns and has a puncture strength of at least 112 g and has a ceramic coating or a polymer coating on at least one side thereof.

23. The separator of claim 22 wherein the coating is a ceramic coating, a PVDF coating, or a PVDF:HFP coating.

* * * * *